United States Patent [19]

Myers et al.

[11] Patent Number: 5,454,099
[45] Date of Patent: Sep. 26, 1995

[54] CPU IMPLEMENTED METHOD FOR BACKING UP MODIFIED DATA SETS IN NON-VOLATILE STORE FOR RECOVERY IN THE EVENT OF CPU FAILURE

[75] Inventors: James J. Myers, San Francisco; Pong-Sheng Wang, San Jose, both of Calif.

[73] Assignee: International Business Machines Corporation, Armonk, N.Y.

[21] Appl. No.: 385,647

[22] Filed: Jul. 25, 1989

[51] Int. Cl.$^6$ .................................................. G06F 12/16
[52] U.S. Cl. ..................... 395/575; 364/DIG. 1; 364/268; 364/285; 395/182.18; 395/489
[58] Field of Search ............................ 364/200 MS File, 364/900 MS File; 320/39 MS File; 371/66, 10.1, 10.2; 395/425

[56] References Cited

U.S. PATENT DOCUMENTS

| | | | |
|---|---|---|---|
| 4,084,231 | 4/1978 | Capozzi et al. | 395/425 |
| 4,530,054 | 7/1985 | Hamstra et al. | 395/425 |
| 4,814,971 | 3/1989 | Thatte | 395/425 |
| 4,819,232 | 4/1989 | Krings | 371/9.1 |
| 4,823,261 | 4/1989 | Bank et al. | 395/425 |
| 4,878,167 | 10/1989 | Kapulka et al. | 395/575 |
| 4,916,605 | 4/1990 | Beardsley et al. | 395/425 |
| 4,942,579 | 7/1990 | Goodlander et al. | 371/51 |
| 4,959,774 | 9/1990 | Davis | 395/575 |
| 5,089,958 | 2/1992 | Horton et al. | 395/575 |

*Primary Examiner*—David L. Robertson
*Assistant Examiner*—Matthew M. Kim
*Attorney, Agent, or Firm*—R. Bruce Brodie

[57] ABSTRACT

A CPU implemented method for managing the backup copying of data sets residing in non-volatile storage and for the recovery thereof in the event of CPU failure. The first step is to invoke a modified incremental backup copy policy using a small backup window and less data than that heretofore used in full, incremental or mixed policies. That is, a backup copy is made to a first designated part of non-volatile storage of only those data sets in a storage group satisfying a pair of adjustable parameters relating the last backup date, the last update, and the current date. The second step occurs during a recovery cycle in the event of CPU failure wherein the backed up datasets are copied from said first designated part into a second designated part of non-volatile storage.

4 Claims, 2 Drawing Sheets

CPU IMPLEMENTED METHOD FOR BACKING UP MODIFIED DATA SETS IN NON-VOLATILE STORE FOR RECOVERY IN THE EVENT OF CPU FAILURE

FIELD OF THE INVENTION

This invention relates to maintaining the continued availability of data sets in central processing unit (CPU) systems having external storage and, more particularly, to a method for scheduling the external storage backup of data sets.

DESCRIPTION OF RELATED ART

A data processing system must be prepared to recover not only from corruptions of stored data such as those due to noise bursts, software bugs, media defects, and write path errors, but also from global events such as CPU power failures. The most common technique to ensure continued availability of data is to make one or more copies of CPU data sets and put them in a safe place. This process is called "backup" and occurs within contexts of storage systems of increasing function.

The following paragraphs briefly describe the contemporary storage environment and a current summary of backup policies and their limitations.

CPU and Staged Storage

Modern data processing machines comprise an instruction processor coupled to a hierarchically organized and least recently used (LRU) managed, staged storage system containing software and data. The fastest, most rapidly accessed storage is positioned closest to the instruction processor. Also, it is placed at the top of the hierarchy. Progressively slower forms of storage, which have the bulk of the information written thereon, occupy the lower positions within the hierarchy.

Because storage costs increase dramatically with speed, many computer systems divide the physical storage subsystem into a number of performance levels. Some of these levels, such as direct access storage device (DASD) and tape, have been treated as peripheral input and/or output (I/O) devices and are accessed over an asynchronous path. Other levels, such as random access memory (RAM) and cache, have been treated directly by system hardware and accessed over a synchronous path as part of internal storage.

The term "internal storage" specifies that portion of storage randomly addressable for single read or write transfers. In International Business Machines Corporation (IBM) systems, internal storage is byte addressable except for an extension ("expanded store"). Expanded store is randomly accessed on a block or page addressable (4096 bytes/block) basis. It is managed as an LRU real memory backed paging store. Lastly, "external storage" refers to that bulk portion of storage that is not randomly addressable and must be directly accessed, as on DASD.

The internal store is deemed "synchronous" when a processor referencing said internal store will idle until a return is received; whereas, if the data being sought resides in external store (beyond a point called the "I/O boundary"), a referencing processor will search for another task to perform instead of waiting. This task or process switching is disruptive in that a retrieval path must be established to the new data and the processing state of the prior task must be saved. When the retrieval from external storage has been completed, it is again necessary to switch the CPU back to the former process or task.

System-managed Storage

System-managed storage (SMS) refers to those CPU and operating system services, such as the IBM Data Facility Storage Management Subsystem, wherein the system automatically allocates data to various storage elements. The data is assigned according to its importance and frequency of use. The concept calls for placing data by priority with the most important data residing closest to the CPU in expanded storage or cache, while the least important data can be stored out on a direct access storage device.

SMS-based systems include a logical data manager (LDM) and an external storage manager (ESM). ESM subsumes the externalized functions associated with space, performance, and availability management of physical storage; that is, storage beyond the I/O boundary. The LDM isolates the access methods and data set management functions from the ESM and is the focus for the logical view of data set format and content, record management, etc. It also provides the storage administration functions of defining and maintaining the logical views of storage, status, allocation and recovery of space, and maintenance scheduling such as backup.

Prior Art Backup Policies

Backup policies are policies of scheduling. They have a time and a space dimension; that is, what should be the frequency of backup and over what range of data sets.

As suggested above, the most common technique used to ensure the continued availability of data (data sets) is to perform periodic backups. Even periodic backups may not be sufficient, however, because all updates to a data set since the last backup may be lost.

Periodic backup suffers from the defect that as a process it is itself executed in batch mode. Batch mode monopolizes a CPU, especially where FULL backup occurs. This is partially remedied by INCREMENTAL backup of only those data sets changed since the last backup. A third policy is scheduling a mix of FULL and INCREMENTAL backup.

Another technique is to write all transactions to a log on a write-ahead data set basis. This is described in Gawlick et al., U.S. Pat. No. 4,507,751, "Method and Apparatus for Logging Journal Data Using a Log Write Ahead Data Set", issued Mar. 26, 1985. In this patent, a unit of work is first recorded on the backup medium (log) and is then written to its external storage address. Unfortunately, the Gawlick system is described with reference to data base management rather than storage management, and incorporates continuous logging to support rollback of incomplete transactions and forward recovery of those transactions completed since the last checkpoint of transactions in flight.

Such intense levels of backup as transaction logging are easier to implement in interactive systems where human response times are log relative to transaction processing. Under that relative time ratio, it is possible to maintain the backup in the same state of consistency as the CPU external store in near real time. It is not feasible, however, where the CPU and external store operate largely in the batch mode.

Limitations of INCREMENTAL, FULL, and MIXED Backup Policies

Where a storage manager or SMS implements only an INCREMENTAL policy, recovering the contents of a single DASD volume may require restoring data from a large number of backup DASD volumes as a function of the spread of DASD and the time at which the changed data sets were backed up. A FULL backup policy suffers the obvious disadvantage of long-time occupancy of the system, while a MIXED policy still results in a spreadout of the backup volumes and more time than an INCREMENTAL policy alone would take.

SUMMARY OF THE INVENTION

It is an object of this invention to devise a method for scheduling the storage backup of data sets in which less data and a smaller backup interval (window) are involved other than that used with prior art FULL, INCREMENTAL, or MIXED backup policies.

It is a related object of this invention that such method be operable either within the context of application-managed storage or SMS.

The foregoing objects are satisfied by a CPU-implemented method for backup copying of data sets residing in internal or external store using a modified INCREMENTAL backup policy where only new and changed data since the last backup will in turn be elsewhere copied. The invention is sensitive to a pair of adjustable parameters (MBF, GBF), where MBF is the minimum period between backups for a data set and GBF is the maximum period between backups of a data set in the larger storage group.

More particularly, the method of the invention is premised on the unexpected observation that a data set is eligible for backup if either:

(1) the date of the last update lies between an instant date and the date of last backup, and the difference between the instant date and the date of last backup equals or exceeds the MBF; or (2) the difference between the instant date and the date of last backup equals or exceeds the GBF.

The parameters GBF and MBF may be either empirically or analytically derived. They are either supplied by the application or the storage administrator portion of SMS.

Based upon this critical observation, the method is the essence of simplicity; namely, (a) during a backup cycle, ascertaining the eligible data sets by evaluating the date of last change and the date of last backup such that a data set is included if it satisfies condition (1) or (2) above; and (b) elsewhere copying the ascertained subset to nonvolatile storage.

Advantageously, when a system using the backup method according to the invention operates in a RECOVERY mode, it need use only those backup volumes no older than the GBF date.

DESCRIPTION OF THE PREFERRED EMBODIMENT

Figure 1:
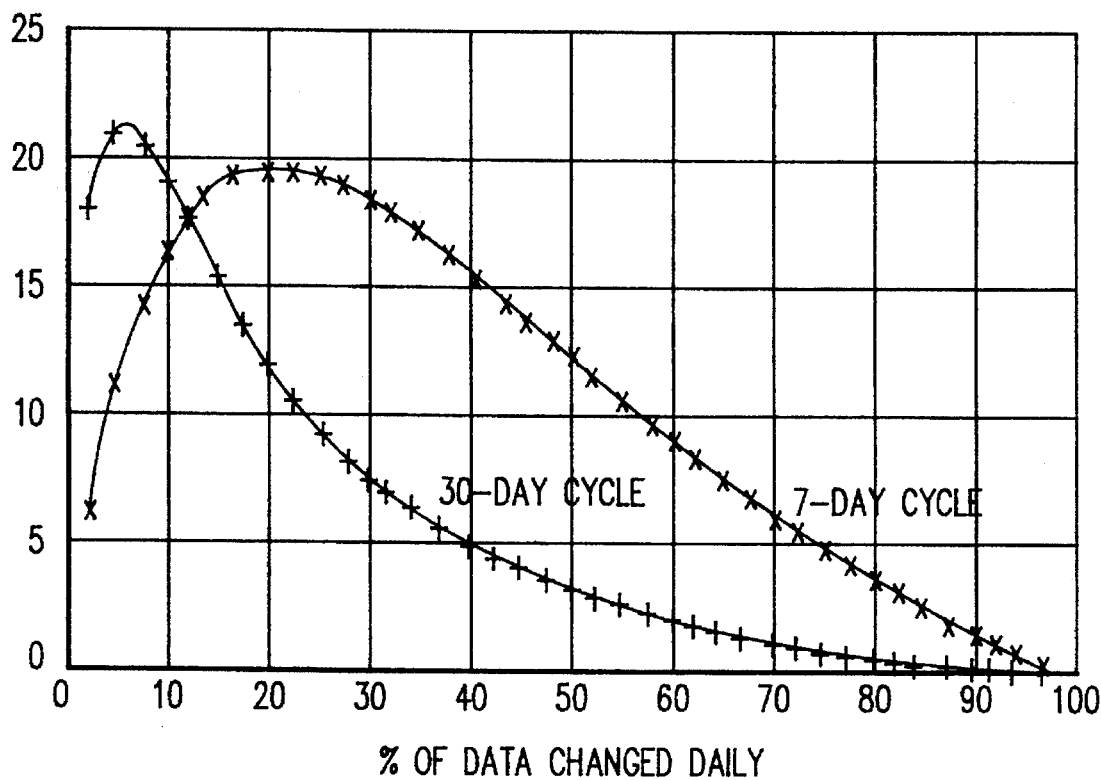
FIG. 1 compares the percentage of backup reduction versus the percentage of data changed daily by use of the inventive method relative to FULL/INCREMENTAL backup policy.

The Host CPU Environment for Executing the Method of the Invention

The invention can be conveniently practiced in a general purpose computer such as an IBM/360 or 370 architected CPU having the IBM MVS operating system. An IBM/360 architected CPU is fully described in Amdahl et al., U.S. Pat. No. 3,400,371, "Data Processing System", issued Sep. 3, 1968.

An MVS operating system (OS) is set out in IBM publication GC28-1150, "MVS/Extended Architecture System Programming Library: System Macros and Facilities", Vol. 1. Details of standard MVS or other operating system services such as lock management, subsystem invocation by interrupt or monitor, and the posting and waiting of tasks is omitted. These OS services are believed well appreciated by those skilled in the art.

If storage is system managed in the manner described by J. P. Gelb, "System-managed Storage", IBM Systems Journal, Vol. 28, No. 1, copyright 1989, at pages 77–103 and especially at pages 90–99, then the storage constructs and organization would differ from that found in an application-provided organization of storage. That is, Gelb posits a STORAGE GROUP as a dynamic pool of external storage volumes as the primary system-manipulable storage element. Other constructs include STORAGE CLASS, MANAGEMENT CLASS, and DATASETS. These constructs respectively represent a desired level of storage service (access, availability); policies controlling data migration, retention, and backup; and the primary application-referenced data/storage elements.

In contrast to the system-controlled service and policy enforcement of storage allocation and scheduling, applications including high-level language (HLL) systems such as PASCAL, COBOL, FORTRAN, and APL come replete with their own file management systems. It is well within the state of the art to devise a monitor-initiated storage backup utility incorporating the method of the invention. Such utility can be written in any of the HLLs and include the HLL logical view of storage.

Aspects of the Method of the Invention

Step 1

Prior to backup processing, the following is done as part of the normal storage management task for setting up the backup/recovery policy in a computer installation. The information obtained in this step is saved for backup processing during the backup cycle:

```
1.a  FOR ALL storage_group(i) in the computer installation
        DO
1.b     GBF(i) := an integer assigned by the Storage
           Administrator or otherwise extrinsically supplied;
1.c  FOR ALL data_object(j) in the computer installation DO
1.d     MBF(j) := an integer assigned by the Storage
           Administrator or otherwise extrinsically supplied;
```

Step 2

During the backup cycle, the computer program performs the following steps:

```
2.a   FOR ALL storage_group(i) in the computer installation
         DO
2.b      FOR ALL data_object(j) in storage_group(i) DO
2.c         BEGIN
2.d            IF (last_change_date(j) >=
                  last_backup_date(j))
                  and
2.e               (instant_date -
                     last_backup_date(j)) >=
                     MBF(j)
2.f            THEN
2.g               call backup(data_object(j));
```

```
-continued 2.h             ELSE
2.i                IF (instant_date -
                      last_backup_date(j)) >=
                            GBF(i)
2.j                THEN
2.k                   call backup(data_object(j));
2.l                ELSE
2.m                   do nothing to data_object(j);
2.n   END;
```

The following is a line-by-line explanation of the above algorithm:

1.a A storage group is a set of storage volumes which contain data objects. A data object is always fully contained in a storage group.

1.b GBF(i) represents the Guaranteed Backup Frequency for storage_group(i). GBF(i) may be assigned different values for different i's. The integer value is specified by the Storage Administrator or is extrinsically supplied through a computer interface or through a defaulting rule.

1.c A data object is a collection of data for which a backup copy is created as a unit and the last_change_date and last_backup_date are tracked. A data object is always fully contained in a storage group.

1.d MBF(j) represents the Minimum Backup Frequency for data_object(j). MBF(j) may be assigned different values for different j's. The integer value is specified by the Storage Administrator or programmer through a computer interface or through a defaulting rule.

2.a Perform Steps 2.b–2.n for each storage group in the computer installation.

2.b Perform Steps 2.c–2.n for each data object in the storage group.

2.d "Last_change_date(j)" and "last_backup_date(j)" represent the dates of last change and last backup, respectively, for data_object(j). Last_change_date(j) is updated whenever data_object(j) is changed. Last_backup_date(j) is updated whenever data_object(j) is backed up.

The last_change_date and last_backup_date may actually be tracked at a finer time unit than days; for example, hours, minutes, or seconds. With a finer time unit, unnecessary backup may be avoided in the case where a data object is backed up shortly after the data object is changed.

The test condition on line 2.d is for data objects that have changed since last backup.

An alternative to using the last_change_time(j) is to use a change_indicator(j), which is set ON whenever data_object(j) is changed and is set OFF whenever data_object(j) is backed up. If this alternative is used, the test condition on line 2.d will be changed to "IF change_indicator(j) is ON and".

2.e The test condition on line 2.e is to ensure that the time difference between two consecutive backups for data_object(j) is at least MBF(j). The Minimum Backup Frequency for a data object is a parameter that the Storage Administrator or programmer can use to control the backup policy for a data object so that the data object may be backed up less frequently than it is changed, if desired.

2.g "Call backup(data_object(j))" represents the process of making a backup copy of data_object(j) to nonvolatile storage, such as a magnetic tape. After the backup is done for data_object(j), the last_backup_date for data_object(j) is set to the current date, i.e., last_backup_date(j) := instant_date.

2.i The test on line 2.i is to ensure that the time difference between two consecutive backups for data_object(j) in storage_group(i) is at most GBF(i). The Guaranteed Backup Frequency is a parameter that the Storage Administrator can use to control the backup policy so that the data objects in a storage group may be backed up more frequently than they are changed. The purpose of Guaranteed Backup Frequency is the minimization of tape mounts for a future volume recovery. This method ensures that backup tapes from at most GBF(i) days are required to recover a volume in storage_group(i).

2.k Same as 2.g.

2.m If data_object(j) failed the tests on 2.d, 2.e, and 2.i, no backup should be made for data_object(j) during this backup cycle.

Parametric Variations

Referring now to FIG. 1, there is shown a comparison between the percentage of backup reduction versus the percentage of data changed daily by the use of the inventive method relative to FULL/INCREMENTAL backup. There are shown results where the backup intervals are 7 and 30 days. The curves are a parametric plot of the relation:

$$(F-G)/F = 1-[(C*P)/[1-(1-C)^P],[\,1+C*(P-1)]]$$

where:
P=the period between two consecutive full-volume backups,
D=the total amount of data,
C=the percentage of total data changed daily and randomly distributed,
G=the total amount of backup data created during the time period P using the method of the invention, and
F=the total amount of backup data created during the time period P using the mixed FULL and INCREMENTAL backup policy.

For instance, where P=a 7-day backup cycle, the method of the invention creates approximately 19 percent less backup data than that produced by the mixed policy when 20 percent of the data sets are changed daily. Where P=a 30-day cycle, the method of the invention produces approximately 22 percent less backup data than the mixed policy when 5 percent of the data sets are changed daily.

Figure 2:
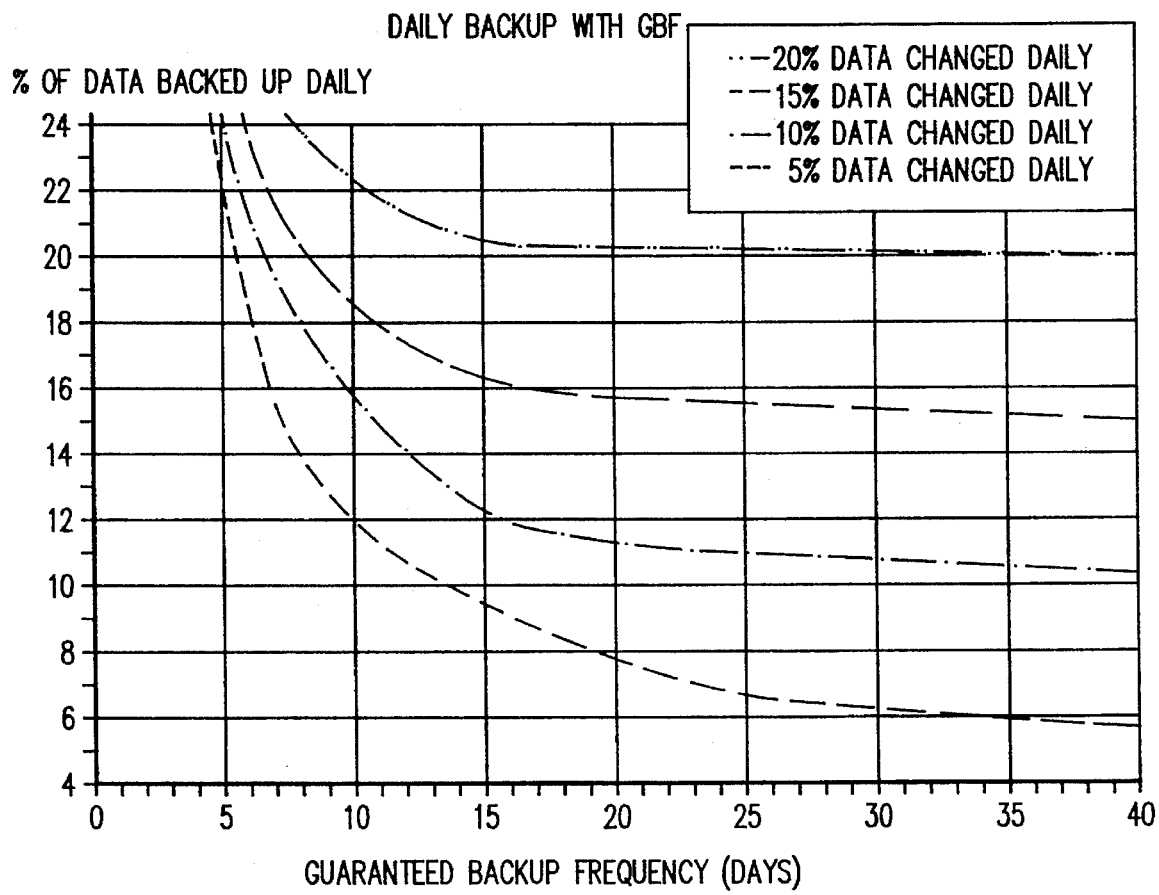
FIG. 2 depicts the percentage of data backed up daily versus the backup interval.

Referring now to FIG. 2, there is depicted the percentage of data backed up daily versus the backup interval. The curves are a parametric plot of the relation:

$$W = C[1-(1-C)^P]$$

where:
W=the daily backup workload and is represented as a percentage of the total amount of data,
P=the period between two consecutive full-volume backups, and
C=the percentage of total data changed daily and randomly distributed.

Examples of the Method of the Invention

Assume that data_objects a, b, c, and d reside in storage_group(x). The current date is 07/17/89. In Step 1.b, GBF(x) is set to a value of 7. In Step 1.d, MBF(a–d) are set to 2, 3, 1, 1, respectively.

Furthermore, assume that data_object(a) and data_object(b) were both last backed up on 07/15/89 and last changed on 07/16/89. Data_object(c) and data_object(d)

were last backed up on 07/10/89 and 07/13/89, respectively. Both data_object(c) and data_object(d) were last changed on 07/01/89.

The following table summarizes the assumptions in this example:

| Date_Object (j) | Last_Backup_Date (j) | Last_Change_Date (j) | MBF (j) |
|---|---|---|---|
| a | 07/15/89 | 07/16/89 | 2 |
| b | 07/15/89 | 07/16/89 | 3 |
| c | 07/10/89 | 07/01/89 | 1 |
| d | 07/13/89 | 07/01/89 | 1 |

Instant_date = 07/17/89
GBF(x) = 7

The following describes the backup processing for data_objects a, b, c, and d in this example.

Data_object (a):

Step 2.d: 07/16/89 >=07/15/89 is true

Step 2.e: (07/17/89–07/15/89)>=2 is true

Since the conditions in steps 2.d and 2.e are both true, step 2.g is executed and data_object(a) is backed up. After the backup, last_backup_date(a) is set to 07/17/89.

In this case, data_object(a) is backed up because it was changed since the last backup and the last backup is already 2 days old; thus, it satisfies the minimum backup frequency for data_object (a).

Data_object(b):

Step 2.d: 07/16/89 >=07/15/89 is true

Step 2.e: (07/17/89–07/15/89)>=3 is false

Since the condition in step 2.e is false, step 2.g is not executed.

Step 2.i: (07/17/89–07/15/89)>=7 is false

Since the condition in step 2.i is false, step 2.k is not executed. Therefore, data_object(b) is not backed up during this backup cycle.

In this case, although data_object(b) was changed since the last backup, its last backup is 2 days old, which is less than MBF(b), and therefore no backup should be done.

Data_object(c):

Step 2.d: 07/01/89 >=07/10/89 is false

Since the condition in step 2.d is false, step 2.g is not executed.

Step 2.i: (07/17/89–07/10/89)>=7 is true

Since the condition in step 2.i is true, step 2.k is executed and data_object(c) is backed up in this backup cycle. After data_object(c) is backed up, last_backup_date(c) is set to 07/17/89.

In this case, although data_object(c) has not been changed since it was backed up on 07/10/89, the time since the last backup has elapsed of 7 days, which is equal to GBF(x), indicates that data_object(c) needs to be backed up again.

Data_object(d):

Step 2.d: 07/01/89>=07/13/89 is false

Since the condition in step 2.d is false, step 2.g is not executed.

Step 2.i: (07/17/89–07/13/89)>=7 is false

Since the condition in step 2.i is false, step 2.k is not executed, i.e., data_object(d) is not backed up during this backup cycle.

In this case, data_object(d) has not been changed since it was last backed up on 07/13/89 and the time since its last backup is only 4 days, which is less than GBF(x); therefore, data_object(d) should not be backed up during this backup cycle.

Various changes and additions can be made to this invention without departing from its spirit and scope as defined in the appended claims.

We claim:

1. In a central processing unit (CPU) having a non-volatile store containing groups of logically independent non-fragmented, non-dispersed sequential datasets, and processor means, said processor means including means for updating and for backing up datasets in each group, said backing up occurring by copying said datasets into a first failure independent part of the nonvolatile store on a selective and on a periodic basis, said processor means further including timing means for assigning a maximum time interval (GBF) to each group in said store and for amending each dataset in each group with a date time stamp denoting dates and times of last backup and last update, a CPU implemented method for backing up of non-fragmented, non-dispersed sequential datasets in non-volatile store and for the recovery thereof in the event of CPU failure, comprising the steps of:

(a) during a backup cycle, ascertaining those data sets in each group conforming to at least one of the following criteria:

(1) the date of their last update lies between an instant date and the date of last backup AND the difference between the instant date and the date of last backup equals or exceeds a first predetermined minimum backup interval (MBF), or (2) the difference between the instant date and the date of last backup exceeds GBF, AND MBF equals or is less than GBF;

(b) copying the ascertained data sets to said first failure independent part of said non-volatile store; and (c) during a recovery cycle, recopying into a second failure independent part of non-volatile store from the first part of non-volatile store said backed up datasets and groups.

2. A CPU implemented method for backup copying of non-fragmented, non-dispersed sequential datasets residing in non-volatile store, said CPU including date and timing means, said datasets forming logically independent storage groups, said method using an INCREMENTAL BACKUP policy where only new and changed data since the last backup will in turn be elsewhere copied in a first failure independent part of said non-volatile store, each data set having written therein its dates of last backup and update, comprising the steps of:

(a) during a backup cycle, ascertaining those datasets within each group eligible for backup by evaluating the date of last change and the date of last backup, a dataset being included for backup copying if it conforms to at least one of the following limitations:

(1) the date of the last update lies between an instant date and the date of last backup AND the difference between the instant date and the date of last backup equals or exceeds a first time interval (MBF), or (2) the difference between the instant date and the date of last backup exceeds a second time interval (GBF), AND MBF equals or is less than GBF; and (b) elsewhere copying the ascertained datasets to said first failure independent part of said non-volatile storage.

3. The method according to claim 2, wherein said INCRE-

MENTAL policy being in contradistinction to either FULL VOLUME backup where all data whether or not changed since the last backup will in turn be elsewhere copied, or COMBINATION backup where FULL VOLUME backup is periodically invoked and INCREMENTAL backup invoked therebetween.

4. The method according to claim 2, wherein MBF is the minimum backup interval for said data sets, and GBF is the backup interval for a cognizant storage group.

* * * * *

UNITED STATES PATENT AND TRADEMARK OFFICE
CERTIFICATE OF CORRECTION

PATENT NO. : 5,454,099
DATED : September 26, 1995
INVENTOR(S) : Myers et al.

It is certified that error appears in the above-indentified patent and that said Letters Patent is hereby corrected as shown below:

Column 2, line 54, delete "log", insert --long--.

Signed and Sealed this

Seventh Day of May, 1996

Attest:

BRUCE LEHMAN

Attesting Officer

Commissioner of Patents and Trademarks